Patented Jan. 9, 1951

2,537,667

UNITED STATES PATENT OFFICE 2,537,667

WATERPROOFING OF FIBROUS PRODUCTS

Jay C. Harris, Dayton, Ohio, assignor to Monsanto Chemical Company, St. Louis, Mo., a corporation of Delaware No Drawing. Application August 24, 1944, Serial No. 551,077

5 Claims. (Cl. 260—21)

This invention relates to a method of imparting water repellent properties to fibrous bodies and to stabilized dispersions employed therein. It is an improvement upon the process described and claimed in the copending application of Earl W. Gluesenkamp, Serial Number 455,349, filed August 19, 1942, now U. S. Patent No. 2,365,813, according to which fibrous products are rendered water-repellent by treatment with an N,N' diacyl diamino methane, such as for instance, N,N'-distearoyldiaminomethane.

Many proposals have been made involving the application to textile materials of amine-aldehyde resins such as urea-formaldehyde, melamine-formaldehyde resins or the resinous methylol ethers thereof. These have been applied either alone or in combination with water-proofing agents such as methylolstearamide or related methylol fatty acid amides as shown in British Patent 495,714. However, as shown in this patent, when using a methylol amide of a fatty acid, it is necessary to employ an acidic catalyst in order to develop water repellency. An acidic catalyst is, moreover, generally required in order to effect a favorable condensation of the amine-aldehyde resin. Compare British Patents Nos. 537,971, 543,360, 506,721 and 501,288. See also U. S. Nos. 2,200,931 and 2,191,362.

Because of the adverse effect of such materials upon textile products made from cotton and rayon, the application thereof has been considerably limited.

I have now found that the further condensation of amine-aldehyde condensation products of the group consisting of melamine-formaldehyde condensation products, urea-formaldehyde condensation products and the alkyl ethers of methylolmelamine and dimethylol urea may be advantageously carried out in the presence of a substantially neutral N,N' diacyl diamino methane having the structure, ROCNHCH$_2$NHCOR, where R is an aliphatic hydrocarbon radical of from 11 to 27 carbon atoms. I have found, moreover, that such condensation may be carried out not only in neutral aqueous solutions or suspensions, but also in the presence of basic substances having a hydrogen ion concentration corresponding to a pH above 7 and preferably between 9.0 and 10.0. As a result, acid sensitive textile products which are ordinarily tendered by the action of acids may be advantageously treated by my process.

As described in the copending Gluesenkamp application, referred to above, the N,N' diacyl diamino methane is most conveniently applied to textile products in the form of aqueous dispersions or suspensions. Excellent repellent effects may be produced by the said invention. Accordingly, in applying the present diamino methane-amine-aldehyde combinations dispersions or suspensions are also desirably employed.

The amine-aldehyde products employed in my combination are alkylol, particularly methylol derivatives of urea or melamine. They are prepared by condensing urea or melamine with an aldehyde, particularly formaldehyde. The resulting compounds are alcohols which may be etherified by reaction with additional alcohols and the resulting ethers also employed for the same purposes. The etherifying alcohols may be aliphatic, saturated alcohols of from one to six carbon atoms. Either methyl, ethyl, propyl, butyl, amyl or hexyl alcohols, or mixtures thereof, may be employed.

In order to produce a urea-formaldehyde condensation product dimethylol urea may be dissolved in an alcohol such as butyl alcohol or a mixture of butyl alcohol and xylol and an acid catalyst such as acetic or formic acid added. The solution is refluxed by the application of heat, after which a part of the solvent is distilled off, at the same time removing the water formed by the condensation. For the present purpose the condensation product is employed as a solution which contains approximately 50% solids (condensation product), 30% xylol and 20% of butanol.

Melamine-formaldehyde condensation products, as well as the methylolmelamine ether condensation products, may be prepared as described in U. S. 2,197,357. Both melamine-formaldehyde condensation products and methylolmelamine ether condensation products are best employed in the form of solutions in butanol or mixtures of butanol and xylol or toluol.

For most satisfactory results in the present process the dibutyl ether of tetramethylol melamine is preferred. It is desirably prepared by a two-step process in which the tetramethylol melamine is first formed and recovered as a crystalline material, after which the dibutyl ether is formed therefrom in a second step.

Crystalline tetramethylol melamine is prepared by reacting four moles of formaldehyde (37% solution) with 1 mole of melamine at a pH of 9.5. The melamine, formaldehyde and a suitable alkaline buffer are heated to 80° C., at which point a clear solution forms. This is cooled slowly to crystallize the tetramethylol melamine which is separated by filtering. The crystal mass is washed with alcohol and dried by suction or other means to a volatile content of 30% or less. This intermediate compound is stable and may be stored indefinitely. It is soluble only in acid solutions or hot water.

In making the ether 100 parts by weight of tetramethylol melamine containing 30% volatiles is suspended in 200 parts by weight of N butanol. This mixture is well agitated and heated to 45° C. At this point 10 parts 85% phosphoric acid is added and the reaction continued at 50° C. for 1 hour. A clear solution forms after about 30 minutes' heating. After this reaction the acid is neutralized with 40% sodium hydroxide and the pH adjusted to phenolphthalein alkaline end point. The neutralized solution of butyl ether in butanol is cooled and filtered to remove the inorganic salt. After removal of the salt, the solution is concentrated to the desired solids content, usually about 60% solids. The product should be completely soluble in butanol and toluene. The residue from the solids determination (3 g. at 135° C. for 2 hrs.) should be fluid on removal from the oven.

Other mineral acids may be used and the ratio of alcohol to methylol compound may be varied when it is desired to produce the various other ethers.

The N,N' diacyl diamino methane employed in the treating suspension is an extremely hydrophobic material and is permanently dispersed in aqueous suspension with considerable difficulty. The difficulty of producing permanent dispersions or suspensions is considerably increased by the presence of the amine-aldehyde condensation products. I have found, however, that suspension of the diacyl diamino methane and the amine-aldehyde condensation products may be obtained as substantially permanent dispersions by the employment of dispersing agents, such as ammonium oleate, triethanolamine oleate, 2-amino-2-methyl-1-propanol oleate or stearate, or in fact by employing any fatty acid salt of a fugitive or volatilizable base. The base should possess sufficient alkalinity so as to impart to the suspension a pH within the limits of 9.0 to 10.0.

Within these limits the aqueous dispersion is a substantially permanent one and the dispersion thus produced is a new article of commerce of such stability that it may be shipped and stored without separation of the solids.

Extremely permanent water repellent properties may be imparted to fibers according to the present invention by merely heating the above described N,N' diacyl diamino methane in the presence of amine-aldehyde condensation products selected from the class consisting of dimethylol urea, dimethylol urea ethers of lower saturated fatty aliphatic alcohols of one to six carbon atoms, tetramethylolmelamine and tetramethylolmelamine ethers of lower saturated aliphatic alcohols of one to six carbon atoms. Since both the N,N' diacyl diamino methane and the amine-aldehyde condensation products are water insoluble (the condensation products, however, being originally hydrocarbon soluble or soluble in alcohol or a mixture of hydrocarbon and alcohol), the application to the textile fiber is most conveniently made by means of an aqueous suspension or dispersion containing both the diamide and the amine-aldehyde condensation product dissolved in a hydrocarbon solvent. Application of the dispersion to the fabric may be made directly by immersion therein as by treatment in a jig or padder, or alternatively by spraying the dispersion upon the textile fabric. While treatment of the fiber is most conveniently carried out by means of a single dispersion containing both the diacyl diamino methane and the amine-aldehyde condensation product, the application may also comprise the successive treatments of fabric with separate dispersions of the condensation product and the diamide, respectively.

The application of the aqueous dispersion to the textile product may take place at any temperature between room temperature and up to temperatures as high as 60° C. to 80° C. After application to the fiber the wetted fiber is dried either at room temperature or in heated air. After the moisture present has been evaporated from the fiber the temperature is raised to a point above 100° C. but below 170° C.–175° C., which heating serves to further condense the condensation product present and to render it substantially insoluble in hydrocarbon solvents.

For the purpose of stabilizing the aqueous dispersion during shipment, storage and application, a dispersing agent comprising a fatty acid salt of a fugitive base is employed. The fatty acid may be any fatty acid saturated, unsaturated or hydroxylated and should have a carbon chain length of at least 12 and up to 20 carbon atoms. Accordingly, there may be employed lauric, stearic, palmitic or oleic acids or other fatty acids contained within the above range of carbon chain length. The fatty acid salt is preferably the ammonium salt, although other bases capable of volatilizing at the temperature at which heat treatment is carried out, may also be used. Such bases may be morpholine, pyridine, cyclohexylamine, 2-amino-2-methyl-1-propanol, etc.

The dispersion contains in addition sufficient ammonia or other fugitive base to bring the hydrogen ion concentration of the dispersion over to the alkaline side of neutrality and preferably to the point where the pH thereof will be within the range of from 9.0 to 10.0. Within this pH range the dispersed diacyl diamino methane and amine-aldehyde condensation product, when reduced by suitable means to a particle size of from 0.5 to 10.0 microns is a stable emulsion both at room temperature and at temperatures as high as 80° C. At temperatures somewhat above the indicated stable temperature range, the ammonia, or other fugitive base which may be combined with the fatty acid, is volatilized leaving behind the free fatty acid. Fortuitously, however, the amine-aldehyde condensation product, even under the alkaline conditions prevailing prior to and during the liberation of the ammonia or other volatile bases from the residue on the fibers, undergoes a further condensation to form a hydrocarbon insoluble resinous condensation product, thus providing a combination imparting permanent water repellent effects upon the fibers.

*Example 1*

Suitable dispersions which may be employed in carrying out the present invention will comprise the following components, the composition thereof being given in per cent by weight:

| | Percent |
|---|---|
| N,N'-distearoyldiaminomethane | 3.5–15 |
| Amine-aldehyde condensation product (solids) | 8.0–24 |
| Fatty acids | 3.5–8.0 |
| Ammonium hydroxide (28%) | 4.0–8.0 |
| Water, balance | |

The size of the dispersed particles of the above suspension should be reduced by the colloid mill to a point below 10 microns and particularly stable suspensions are obtained when the sizes of the particles therein are maintained between the limits of 0.5 and 10.0 microns. The pH of the aqueous dispersion may be adjusted to between 9.0 and 10.0 by the addition of ammonium hydroxide or other volatile base. Non-volatile bases such as sodium, potassium or other alkali metal salts should not, however, be employed.

The dispersion is prepared by adding the fatty acid (molten if necessary) to the water, adding the ammonia, agitating the mixture by passing through a colloid mill and then adding the finely powdered N,N'-distearoyldiaminomethane, and then the amine-aldehyde condensation product as a hydrocarbon solution. The whole is again passed through a colloid mill set with an aperture between rotor and stator of about 0.003 inch.

The dispersions are, for convenience in shipping and handling, produced as described in a concentrated form containing from 15% to 47% of solids so that prior to application they may be diluted by addition thereto of the proper amount of water. The addition of water to the concentrated dispersion will enable one to reduce the total solids in the textile treating bath down to the range of from 1% to 10% by weight, or preferably between 2.5% and 10% by weight. As explained below the total amount of dispersion picked up by the textile product during treatment may be varied by control of the nip of the padder rolls and accordingly may be varied, depending upon the type of fabric, weave, etc. to between 40% and 125% of its dry weight.

*Example 2*

The dispersion described above may be varied somewhat by including therein such well known water repellents as paraffin wax and aluminum stearate if desired for the purpose of lowering the production cost. When such cheaper ingredients are included as components of the dispersion, they serve to give an initially high repellency value. However, since they are readily removed by washing with soap, or other detergents, the final repellency is somewhat decreased. They may, however, be satisfactorily employed for tents, tarpaulins, awnings, sails, etc., or other like outdoor textile materials where the fabric is not to be subjected to washing with soap. For this particular purpose the following dispersions will be found very useful:

| | Percent |
|---|---|
| N,N'-distearoyldiaminomethane | 3.5–15 |
| Amine-aldehyde condensation product (solids) | 8.0–24 |
| Fatty acids (stearic or oleic acid) | 3.5–8 |
| Paraffin wax | 3.5–8 |
| Ammonium hydroxide (28%) | 4.0–8 |
| Water, balance | |

The dispersion is made as described in Example 1, the wax being incorporated by melting together with the diamide, which is then stirred into the aqueous solution of ammonium soap.

*Example 3*

As suggested, aluminum stearate may be also employed in the above dispersions, in which case it may comprise up to an amount equal to the N,N'-distearoyldiaminomethane. Thus, a satisfactory emulsion containing this ingredient will comprise the following:

| | Percent |
|---|---|
| N,N'-distearoyldiaminomethane | 1.75–7.5 |
| Aluminum stearate | 1.75–7.5 |
| Amine-aldehyde condensation product (solids) | 8.0–24 |
| Fatty acids (stearic or oleic acid) | 3.5–8 |
| Ammonium hydroxide (28%) | 4.0–8 |
| Water, balance | |

After the fabric has been treated with one of the above dispersions and then dried, it should be exposed to temperatures sufficient to cure the amine-aldehyde condensation product under the alkaline conditions prevailing on the fiber. I have found that treated and dried fabric heated to 100° C. for up to 30 minutes, while giving an initial high repellency, will not retain such high repellency if subjected to washing, but, as stated above, will be suitable for many purposes where washing is not contemplated. However, satisfactory permanent repellency may be obtained by heating to a temperature of 120° C. for from 10 to 30 minutes and somewhat better results are obtained at 130° C., at which temperature the heating period may be as short as 5 minutes.

In accordance with the practice in this art, the comparative water-repellency of the fabrics treated by the herein described process may be evaluated by means of various tests. One of these tests, known simply as the Spray Test and described in the American Dyestuffs Reporter, vol. 28, page 285 for 1939, measures the amount of water absorbed by a sample of treated cloth after the sample has been exposed to a spray of water for a specified length of time. The other, and more recently developed test which is known as the Standard (Portable) Spray Test provides a rapid, semi-quantitative method, the results of which are expressed in arbitrary units, is designed to measure the amount of water adhering to the surface of a sample of treated cloth after exposure to a spray of water. The Standard (Portable) Spray Test is described in the 1943 Yearbook of the American Association of Textile Chemists and Colorists at pages 236–238. Fabrics treated by the process of this invention show percentage absorption values and Standard (Portable) Spray adherence values which indicate very good water-resistance.

*Example 4*

Strips of Indian Head cloth, 6 inches wide, were run for from 1 to 2 ends on a padding machine through the aqueous dispersions described in Example 2 above, each dispersion having been adjusted so that it contains respectively 2.5%, 5% and 10% solids. For each of the 3 solutions tests were made in triplicate; so that a total of 9 runs were made. After application of the dispersion the strips of cloth were air-dried and then baked for approximately 5 minutes at a temperature of 150° C.

The water repellency of the treated cloth was evaluated by employing the Spray Test and the Standard (Portable) Spray Test referred to above, the cloth was then laundered 3 times by the laundering procedure described in Federal Laundering Specification CCC—T—191, and the water repellency of the washed cloth was again tested by the same spray tests. The strips of cloth were air-dried after washing, but not baked. The following water-repellency values were obtained before and after laundering:

| Per Cent Total Solids in Treating Dispersion | Per Cent Pick-up of Dispersion | Rating by: Standard (Portable) Spray Test | | Rating by: Spray Test Per Cent Water Absorption | |
|---|---|---|---|---|---|
| | | Before Laundering | After Laundering | Before Laundering | After Laundering |
| 10 | 127 | 100 | 90 | 4.2 | 24.5 |
| 10 | 101 | 100 | 90 | 4.7 | 28.1 |
| 10 | 78 | 100 | 90 | 4.6 | 32.5 |
| 5 | 125 | 100 | 90 | 7.6 | 34.5 |
| 5 | 99 | 100 | 90 | 8.1 | 30.8 |
| 5 | 81 | 100 | 90 | 4.8 | 37.8 |
| 2.5 | 121 | 100 | 90 | 7.3 | 30.8 |
| 2.5 | 100 | 100 | 90 | 8.4 | 32.3 |
| 2.5 | 81 | 100 | 90 | 19.1 | 50.2 |

The per cent pick-up is an expression used to designate the weight of aqueous dispersion that the cloth picks up from the treating bath. In other words, when the strips of cloth were run through the treating dispersions, as shown above, they carried away from 78% to 127% of their dry weight of solution. In the first run of the above table 100 grams of fabric picked up 127 grams of a 10% dispersion of ingredients. This means that 12.7 grams of the solid ingredients in the dispersion was applied to the cloth. Note that solutions containing only 2.5% of active ingredient gave substantially the same pick-up as those containing 10% active ingredient.

Military specifications on water-repellency as determined by the Standard (Portable) Spray Test, as stated in the Quartermaster Corps Tentative Specification P. Q. D. No. 1A, dated November 11, 1942, demand the following minimum requirements:

| | Spray rating |
|---|---|
| Initially | 90 |
| After 3 launderings | 70 |
| After 3 dry cleanings | 70 |

The spray rating refers to arbitrary values as determined by the Standard (Portable) Spray Test herein described and outlined also under Section F—3B of the Quartermaster Specification noted above. The laundering must be carried out by the testing method described in Section XIV—1 and 2 of Federal Specification CCC—T—191, which method is that referred to above. Accordingly, the present water-repellency treatment more than meets the requirements of the Quartermaster Corps Specification, for it gives an initial spray rating of 100 versus the 90 required by the specification and a spray rating of 90 versus 70 required after three launderings.

The present water-repellency treatment also more than meets the spray rating requirements after 3 dry cleanings. When subjected to the Dry Cleaning Test described in Section XIII, Paragraph 4, Federal Specification CCC—T—191, samples of cloth treated as described in this example all had a spray rating of above 70.

*Example 5*

This example shows the use of triethanolamine oleate as the dispersing agent in the preparation of dispersions of a mixture of paraffin wax, N,N'-distearoyldiaminomethane and the di-butyl ether of tetramethylolmelamine. Employing the procedure described in Example 1, a dispersion was prepared consisting of 20 parts by weight of triethanolamine oleate, 109 parts by weight of water, 10 parts by weight of paraffin wax, 20 parts by weight of N,N'-distearoyldiaminomethane and 41 parts by weight of a 60% butanol solution of di-butyl ether of tetramethylolmelamine. When a strip of cloth was run on a padding machine through a solution of this dispersion containing a total of 10% solids and the cloth was dried, baked and laundered as described in Example 1, it was found to have a spray rating of 80 as determined by the Standard (Portable) Spray Test herein described.

*Example 6*

When 20 parts of 2-amino-2-methyl-1-propanol oleate was employed instead of the 20 parts of triethanolamine oleate in preparing the dispersion of Example 2, and a strip of cloth was treated by running it on a padding machine through a solution of this dispersion containing a total of 30% solids, there was obtained after baking and laundering as described in Example 1 a spray rating of 90 as determined by the Standard (Portable) Spray Test.

*Example 7*

This example shows the use of a melamine-formaldehyde condensation product in the water insoluble stage instead of the di-butyl ether of tetramethylolmelamine as the resinous constituent of the water-proofing dispersion.

Employing the procedure described in Example 1, a dispersion was prepared consisting of 15 parts by weight of oleic acid, 12.6 parts by weight of ammonia water (28%), 91.9 parts by weight of water, 10 parts of paraffin, 20 parts of N,N'-distearoyldiaminomethane, 30 parts of mineral spirits and 45.5 parts by weight of a 60% solution of melamine-formaldehyde condensation product dissolved in a mixture of butanol and xylol. When a strip of cloth was run on a padding machine through this dispersion containing a total of 10% of solids and the treated cloth was dried, baked and laundered as described in Example 1, it was found to have a spray rating of 100 as determined by the Standard (Portable) Spray Test herein described and an absorption value of 24.0% as determined by the water absorption Spray Test.

*Example 8*

This example employs a urea-formaldehyde condensation product as the resin forming constituent of the present water-repelling dispersions.

Employing the procedure described in Example 1, a dispersion was prepared consisting of 10 parts by weight of oleic acid, 12.6 parts by weight of 28% ammonia, 108.4 parts by weight of water, 10 parts by weight of paraffin wax, 10 parts by weight of N,N'-distearoyldiaminomethane, 19 parts by weight of aluminum stearate, 10 parts by weight of butyl alcohol, 20 parts by weight of mineral spirits and 50 parts by weight of a 50% solution of a urea-formaldehyde condensation product in a mixture of butanol and xylol. When a strip of cotton cloth was run on a padding machine through a solution of this dispersion containing a total of 10% of active ingredients (wax, diamide, aluminum stearate and condensation product), and the treated cloth was dried, baked and laundered as described in Example 1, it was found to have a spray rating of 80 as determined by the Standard (Portable) Spray Test herein described and an absorption value of 26.4% as determined by the water absorption Spray Test.

Although the present invention has been described particularly to the treatment of cotton fabrics for the purpose of conferring durable, water-repellent properties to the same, the invention is likewise applicable to the water-proofing of loose cotton fibers or other fibers and textile fabrics made therefrom such as linens, wool, jute, wood, artificial silks such as rayons or cellulose acetate and synthetic fibers, for example, fibers and textiles prepared from such polymeric materials as the polyamides, the polyvinyl acetals, the polyethylenes, the copolymers of vinyl chloride with vinyl acetate, etc. Paper or wood products may also be treated by the herein described process. The herein described process may also be applied to fabrics which have been given a prior fungus-resistant or rot-proofing treatment.

Textile products treated with aqueous dispersions containing N,N'-distearoyldiaminomethane and the dibutyl ether of tetramethylol melamine possess the property of repeatedly developing water-repellency without reheating after washing, after the product has once been properly applied as described above. This property, which is not possessed by the aminealdehyde resins themselves, enables one to merely dry the textile product at ordinary temperatures and without necessarily raising the temperature of the treated material above room temperature.

While relatively dilute concentrations of the mixture of diamino methane, paraffin wax and amine-aldehyde condensation product in the dispersion, say, from a total of 1% to 10% may be employed for the application to the cloth, even more concentrated dispersions, say, up to 40% or 50% concentration of active ingredients may be advantageously prepared, which concentrated dispersions may be diluted to a satisfactory lower dilution prior to application to cloth. In general, suitable treating solutions may contain an amount of dispersing agent ranging from 1% to 10% or more by weight of the total weight of the active ingredients. Such treating solutions may conveniently be marketed directly as dispersions either in concentrated form or in dilute form ready for application to textiles. Or the dry, powdered mixture of diamide, wax and condensation product may be marketed as such, or it may have mixed therewith a dispersion agent also in dry form, or the mixture of wax, diamino methane and condensation product may, prior to drying be treated with solutions of the dispersing agent and then dried to obtain a dry powder upon the particles of which is coated the dispersion agent.

Instead of N,N'-distearoyldiaminomethane, other diacyl derivatives in which the acyl group is derived from aliphatic acids having from 12 to 28 carbon atoms may be employed, for example, N,N' dioleoyl or N,N' dimontanoyl diamino methane. N,N' diacyl diamino methanes, derived from technical mixtures of higher aliphatic acids such as technical lauric acid, palmitic or stearic acid, may likewise be used.

Obviously, many modifications and variations may be made in the process described above without departing from the spirit and scope of the invention as defined in the appended claims.

What I claim is:

1. An aqueous dispersion wherein the disperse phase consists of particles having a size between the limits of 0.5 to 10.0 microns and the aqueous phase has a hydrogen ion concentration between the limits of pH=9.0 and 10.0 comprising the following ingredients in per cent by weight:

| | Percent |
|---|---|
| N,N'-distearoyldiaminomethane | 3.5–15 |
| Hydrocarbon soluble resinous dibutyl ether of tetramethlylolmelamine | 8.0–24 |
| Oleic acid | 3.5–8 |
| Ammonium hydroxide (28%) | 4.0–8 |
| Water, balance | |

2. An aqueous dispersion wherein the disperse phase consists of particles having a size between the limits of 0.5 to 10.0 microns and the aqueous phase has a hydrogen ion concentration between the limits of pH=9.0 and 10.0 comprising the following ingredients in per cent by weight

| | Percent |
|---|---|
| N,N'-distearoyldiaminomethane | 3.5–15 |
| Hydrocarbon soluble resinous dibutyl ether of tetramethylolmelamine | 8.0–24 |
| Oleic acid | 3.5–8 |
| Paraffin wax | 3.5–8 |
| Ammonium hydroxide (28%) | 4.0–8 |
| Water, balance | |

3. An aqueous dispersion wherein the disperse phase consists of particles having a size between the limits of 0.5 to 10.0 microns and the aqueous phase has a hydrogen ion concentration between the limits of pH=9.0 and 10.0 comprising the following ingredients in per cent by weight:

| | Percent |
|---|---|
| N,N'-distearoylaminomethane | 1.75–7.5 |
| Aluminum stearate | 1.75–7.5 |
| Hydrocarbon soluble resinous dibutyl ether of tetramethylolmelamine | 8.0–24 |
| Oleic acid | 4.0–8.0 |
| Ammonium hydroxide (28%) | 4.0–8.0 |
| Water, balance | |

4. An aqueous suspension comprising a disperse phase and an aqueous phase, said disperse phase containing from 3.5% to 15% by weight based on said aqueous suspension, of N,N'-diacyldiaminomethane, wherein the acyl groups are derived from fatty acids of 12 to 28 carbon atoms, from 8% to 24% by weight based upon said aqueous suspension of a product selected from the group consisting of dimethylol urea, tetramethylolmelamine and the one to six carbon atom aliphatic saturated alcohol ethers of dimethylol urea and tetramethylolmelamine, said disperse phase consisting of particles having a size between the limits of 0.5 to 10.0 microns and said aqueous phase containing a fatty acid salt of a fugitive base, said fatty acid having from 12 to 20 carbon atoms, said aqueous phase having a hydrogen ion concentration between the limits of pH=9.0 and pH=10.0.

5. An aqueous suspension comprising a disperse phase and an aqueous phase, said disperse phase containing from 3.5% to 15% by weight based on said aqueous suspension, of N,N'-distearoyl diaminomethane, from 8% to 24% by weight, based on said aqueous suspension of the dibutyl ether of tetramethylolmelamine, said disperse phase consisting of particles having a size between the limits of 0.5 to 10.0 microns and said aqueous phase containing ammonium oleate and having a hydrogen ion concentration between the limits of pH=9.0 to pH=10.0.

JAY C. HARRIS.

REFERENCES CITED

The following references are of record in the file of this patent:

UNITED STATES PATENTS

| Number | Name | Date |
|---|---|---|
| 2,200,164 | Durant | May 7, 1940 |
| 2,344,926 | Thackston et al. | Mar. 21, 1944 |
| 2,357,273 | Thurston | Aug. 29, 1944 |
| 2,365,813 | Gluesenkamp | Dec. 26, 1944 |
| 2,423,428 | Pollard | July 1, 1947 |

FOREIGN PATENTS

| Number | Country | Date |
|---|---|---|
| 495,714 | Great Britain | Nov. 14, 1938 |
| 537,971 | Great Britain | July 16, 1941 |